United States Patent
Clark

(10) Patent No.: US 12,179,775 B2
(45) Date of Patent: Dec. 31, 2024

(54) SYSTEMS AND METHODS OF DRIVING BEHAVIOR ASSESSMENT USING TELEMATICS DATA

(71) Applicant: Allstate Insurance Company, Northbrook, IL (US)

(72) Inventor: Melanie Clark, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 262 days.

(21) Appl. No.: 17/829,522

(22) Filed: Jun. 1, 2022

(65) Prior Publication Data

US 2023/0391346 A1 Dec. 7, 2023

(51) Int. Cl.
*B60W 40/09* (2012.01)
*G06Q 40/08* (2012.01)
*G07C 5/00* (2006.01)

(52) U.S. Cl.
CPC ............. *B60W 40/09* (2013.01); *G06Q 40/08* (2013.01); *G07C 5/008* (2013.01); *B60W 2540/30* (2013.01)

(58) Field of Classification Search
CPC .. B60W 40/09; B60W 2540/30; G06Q 40/08; G06Q 10/0635; G06Q 10/06398; G06Q 50/40; G07C 5/008; H04W 4/40
See application file for complete search history.

(56) References Cited

U.S. PATENT DOCUMENTS

| | | | |
|---|---|---|---|
| 9,805,601 B1 | 10/2017 | Fields et al. | |
| 2013/0190967 A1 | 7/2013 | Hassib et al. | |
| 2013/0317665 A1 | 11/2013 | Fernandes et al. | |
| 2017/0365007 A1* | 12/2017 | Huls | ........................ H04W 4/40 |
| 2018/0211218 A1* | 7/2018 | Berdinis | .............. G05D 1/0212 |
| 2019/0367039 A1* | 12/2019 | Persia | .................. G06V 20/597 |
| 2021/0035224 A1 | 2/2021 | Crabtree et al. | |
| 2021/0067946 A1 | 3/2021 | Herbert et al. | |
| 2021/0264512 A1 | 8/2021 | Gaudin et al. | |
| 2021/0264536 A1 | 8/2021 | Dahl | |
| 2021/0295440 A1 | 9/2021 | Hayward et al. | |
| 2021/0326991 A1 | 10/2021 | Roll | |
| 2023/0274592 A1* | 8/2023 | Sanchez | ................ B60W 40/09 |
| | | | 701/33.4 |

OTHER PUBLICATIONS

International Search Report and The Written Opinion of The International Searching Authority for International Application No. PCT/US2023/023799 dated Sep. 6, 2023 (13 pages).

* cited by examiner

*Primary Examiner* — Omeed Alizada
(74) *Attorney, Agent, or Firm* — Polsinelli PC

(57) ABSTRACT

Implementations claimed and described herein provide systems and methods for generating a driving behavior assessment using telematics data. The systems and methods use different types of telematics data generated via different data connections. Vehicle behavior telematics data is generated using a first type of connection with a vehicle (e.g., using an onboard diagnostics (OBD) device) and personal mobility telematics data is generated using a second type of connection via a mobile device associated with a vehicle operator. One or more driving attributes associated with the vehicle operator are determined by the system based on at least one of the vehicle behavior telematics data or the personal mobility telematics data. Scoring factors are calculated based on the one or more driving attributes. Furthermore, a policy level rate structure for an insurance policy can be generated based on the one or more scoring factors.

20 Claims, 6 Drawing Sheets

SYSTEMS AND METHODS OF DRIVING BEHAVIOR ASSESSMENT USING TELEMATICS DATA

FIELD

Aspects of the presently disclosed technology relate generally to risk assessment techniques and more particularly to assessing driving behavior based on telematics data.

BACKGROUND

Insurance companies rely on many different factors to predict the risk of an individual so profitable rates can be set. Typically, insurance rates for drivers are calculated using large amounts of data related to the individual. Personal data associated with the individual (e.g., age and driving history) can be used as well as information relating to broader demographic groups to which the individual belongs. Regional information and historical risk assessment outcomes are also often used to calculate a risk assessment for the individual.

However, incorporating these various types of data from different sources into an insurance product to create personalized insurance products is difficult from a data management standpoint. Some systems would like to include telematics data into a risk assessment, but the data flow configuration and data structure of telematics devices limits the feasibility of integrating this type of data into insurance products. As such, telematics-based insurance products often limit the scope and type of data that is used while simplifying the policy structure to align with their limited data collection capabilities.

It is with these observations in mind, among others, that various aspects of the present disclosure were conceived and developed.

SUMMARY

Implementations described and claimed herein address the foregoing problems by providing systems and methods for of driving behavior assessment using telematics data. For instance, a method of driving behavior assessment using telematics data can comprise: determining vehicle behavior telematics data generated using a first type of connection with a vehicle; determining personal mobility telematics data generated using a second type of connection with a mobile device associated with a vehicle operator, the second type of connection is a different type of connection than the first type of connection; determining one or more driving attributes associated with the vehicle operator based on at least one of the vehicle behavior telematics data or the personal mobility telematics data; calculating one or more scoring factors based on the one or more driving attributes; generating a policy level rate structure for an insurance policy based on the one or more scoring factors; and generating the insurance policy using the policy level rate structure.

In some examples, the one or more scoring factors include a plurality of vehicle operator scoring factors that are used to calculate the policy level rate structure, one of the plurality of vehicle operator scoring factors corresponds to an individual vehicle operator. Additionally, the one or more scoring factors can include a plurality of behavioral component scoring factors that are used to calculate the policy level rate structure, one of the plurality of behavioral component scoring factors corresponds to a plurality of vehicle operators. Furthermore, the insurance policy can apply the policy level rate structure to a plurality of vehicles associated with the vehicle operator. In some instances, the second type of connection is an on-board diagnostics-II (OBD-II) device installed at the vehicle and/or another type of device (e.g., a tag-based system, an original equipment manufacturer (OEM) connection integrated into the vehicle, a GPS unit, combinations thereof, or the like). The method can further comprise sending, in response to receiving an input at a computing device associated with the vehicle operator, the OBD-II device to a location associated with the vehicle operator.

In some instances, the vehicle behavior telematics data generated using the first type of connection with the vehicle includes: first acceleration data; first braking data; and first location data; and the personal mobility telematics data generated using the second type of connection with mobile device includes: second acceleration data; second braking data; and second location data. The method can further comprise generating a first weighing coefficient for the vehicle behavior telematics data and a second weighing coefficient for the personal mobility telematics data, the first weighing coefficient being greater than the second weighing coefficient. Moreover, the method can comprise: detecting a telematics data omission in the vehicle behavior telematics data; and in response to detecting the telematics data omission, determining the one or more driving attributes based on the personal mobility telematics data instead of the vehicle behavior telematics data. Additionally or alternatively, the method comprises: determining which of the vehicle behavior telematics data and the personal mobility telematics data is more recent telematics data and less recent telematics data; and determining the one or more driving attributes based on the more recent telematics data instead of the less recent telematics data. Some scenarios include causing, at the mobile device, a user interface (UI) to be generated presenting one or more indications of the one or more driving attributes. Furthermore, the one or more driving attributes can include two or more of: a rate of braking; a driving speed at a time of braking; a driving time of day; a recurring driving event; a percent of miles above or below a speed limit; and an amount of phone handling. Additionally, the vehicle operator can be a first vehicle operator; and the one or more indications can be changeable, based on a vehicle operator input received at the UI, between corresponding to the vehicle, the first vehicle operator, or a second vehicle operator associated with the first vehicle operator.

In some examples, a system of driving behavior assessment using telematics data comprises: at least one processor configured to: determine vehicle behavior telematics data generated using a first type of connection with a vehicle; determine personal mobility telematics data generated using a second type of connection with a mobile device associated with a vehicle operator, the second type of connection is a different type of connection than the first type of connection; determine one or more driving attributes associated with the vehicle operator based on at least one of the vehicle behavior telematics data or the personal mobility telematics data; calculate a plurality of vehicle operator scoring factors or a plurality of driving attribute scoring factors based on the one or more driving attributes, one of the plurality of vehicle operator scoring factors corresponds to an individual vehicle operator, and one of the plurality of driving attribute scoring factors corresponds to a plurality of vehicle operators; generate a policy level rate structure for an insurance policy based on the plurality of vehicle operator scoring factors or the plurality of driving attribute scoring factors; and generate the insurance policy using the policy level rate structure.

Furthermore, the one or more driving attributes can include a rate of braking associated with a driving speed at a time of the braking; a driving time of day associated with a recurring driving event; a driving speed associated with a population density or associated with a time of day; and/or a percent of miles over a speed limit associated with a population density or associated with a time of day.

In some instances, one or more tangible non-transitory computer-readable storage media store computer-executable instructions for performing a computer process on a computing system, the computer process comprising: determining vehicle behavior telematics data generated using a first type of connection via an onboard diagnostics device (OBD) installed in a vehicle; determining personal mobility telematics data generated using a second type of connection with a mobile device associated with a vehicle operator, the second type of connection is a different type of connection than the first type of connection; determining one or more driving attributes associated with the vehicle operator based on the vehicle behavior telematics data and the personal mobility telematics data; calculating one or more scoring factors based on the one or more driving attributes; generating a policy level rate structure for an insurance policy based on the one or more scoring factors; and generating the insurance policy using the policy level rate structure. Additionally, the one or more driving attributes associated with the vehicle operator can include: an amount of driven miles associated with the vehicle based on the vehicle behavior telematics data; and a driving speed associated with the vehicle operator based on the personal mobility telematics data.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1:
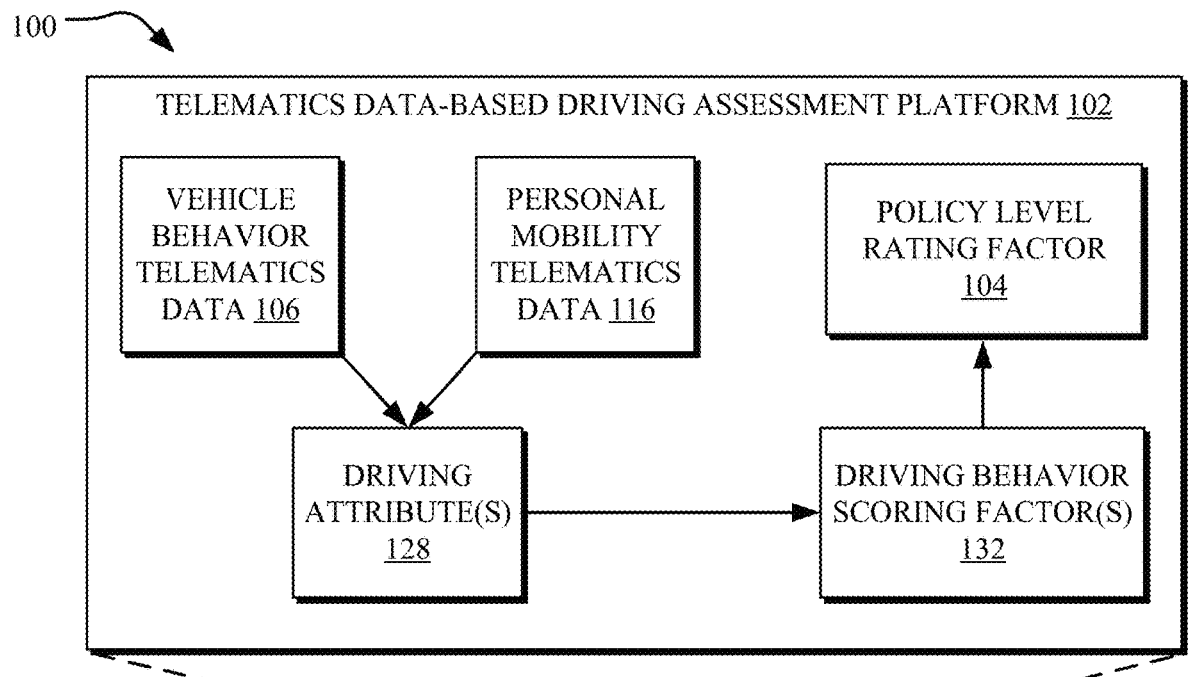
FIG. 1 illustrates an example system to generate a driving behavior assessment using different types of telematics data.
Figure 1:
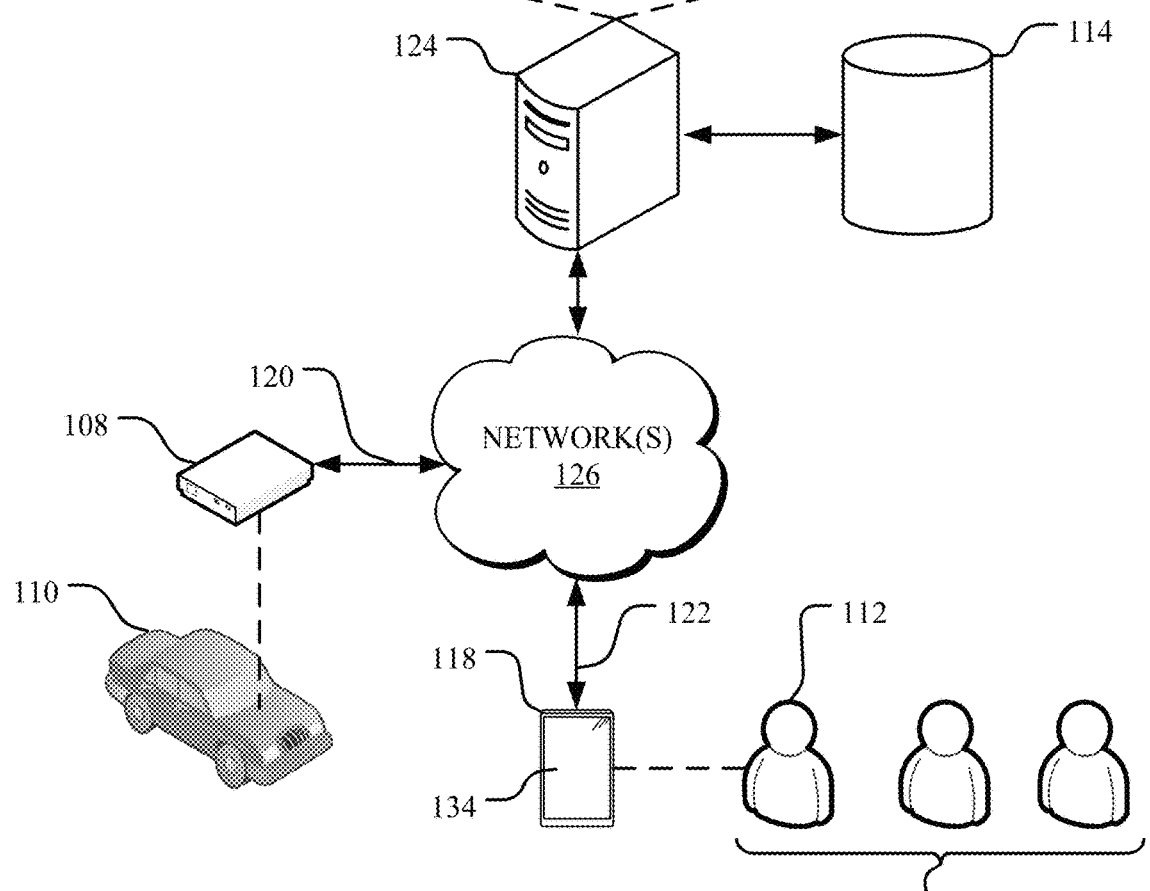

Aspects of the present disclosure involve systems and methods to generate a driving behavior assessment using telematics data. The systems and methods described herein use different types of telematics data generated by different telematics devices (e.g., via different data connections) to provide a more comprehensive aggregation of data related to driving behavior. This results in a more accurate driving behavior assessment that captures the nuances between different driving behaviors that may be difficult to capture using a single source of telematics data.

In some examples, vehicle behavior telematics data is generated via a first type of connection with a vehicle using an onboard diagnostics (OBD) device installed in the vehicle. The OBD device can capture and send a first type of data to a telematics data-based driving assessment platform representing vehicle driving and usage (e.g., independent of which vehicle operator is using the vehicle). The telematics data-based driving assessment platform can also receive personal mobility telematics data generated using a second type of connection via a mobile device associated with a vehicle operator. This data can be associated with the particular vehicle operator and, in some instances, multiple vehicle operators can generate multiple personal mobility telematics data transmissions that correspond to the different vehicle operators. The telematics-based driving assessment platform can aggregate this data, generate associations between this data (e.g., based on matching timestamps), and/or perform one or more data selection procedures (e.g., based on detecting a data omission or error in one of the types of data).

The system can determine one or more driving attributes associated with the vehicle operator based on the aggregated vehicle behavior telematics data and personal mobility telematics data. For instance, the telematics data-based behavior assessment platform can determine an amount of driving (e.g., for the vehicle or the vehicle operator); a rate of braking (e.g., soft braking, hard braking, extreme braking, etc.); a recurring driving event; a driving time of day; a percent of miles above or below a speed limit; a percent of miles driven on roads within a given speed limit; a speed at time of braking; an amount of phone handling; and the like. Moreover, these driving attributes can be associated and/or combined together (e.g., based on matching timestamps and/or matching location data) to develop more advanced driving attributes. Advanced driving attributes can include a driving time of day for a particular driving event; a driving time of day for miles above the speed limit; a rate of braking (e.g., associated with a time of day); a speed limit by time of day; and a trip consistency for particular times of day or periods of time from week to week. Then the system can calculate scoring factors based on the driving attributes using one or more of a vehicle operator-based scoring procedure or a driving attribute-based scoring procedure. The scoring factors can represent weighting values corresponding to a particular operator (e.g., a vehicle operator scoring factor) or a particular driving attribute (e.g., a driving attribute scoring factor) representing an amount of risk associated with the particular operator or the particular driving attribute. A policy level rate structure for an insurance policy can be generated and/or adjusted based on the one or more scoring factors, which captures a more accurate, personalized, and sophisticated assessment of driving behavior, resulting in an improved assessment of risk for the vehicle operator.

Additional advantages of the presently disclosed technology will become apparent from the detailed description below.

To begin a detailed description of an example system 100 to assess driving behavior using telematics data, reference is made to FIG. 1. The system 100 can include a telematics data-based driving assessment platform 102. The telematics data-based driving assessment platform 102 can receive multiple, different types of telematics data from different data sources using different types of data connections. Upon receiving the telematics data, the telematics data-based driving assessment platform 102 can perform operations to transform the different types of telematics data into a driving behavior assessment and/or a policy level rating factor 104.

In some examples, a first type of telematics behavior data can be vehicle behavior telematics data 106 generated by on on-board diagnostics (OBD) device 108. The OBD device 108 can be installed in a vehicle 110 associated with a target vehicle operator 112. In some scenarios, the OBD device 108 is an OBD-II device and/or can generate data corresponding to various OBD parameter IDS (OBD-II PIDs) which can be defined by Society of Automotive Engineers (SAE) standards. Additionally or alternatively, the OBD device 108 includes tag-based technology (e.g., a radio frequency identification (RFID) tag), an original equipment manufacturer (OEM) connection integrated into the vehicle 110 (e.g., an infotainment system), a GPS unit, combinations thereof, or the like. Accordingly, the vehicle behavior telematics data 106 can include data indicating operational performance and/or mechanical events of the vehicle 110. The vehicle behavior telematics data 106 can include first acceleration data, first braking data, first location data, and/or first speed data. These different types of vehicle behavior telematics data 106 can be associated with one or more timestamps. For instance, the vehicle behavior telematics data 106 can be transmitted on a rolling basis, on a batch basis (e.g., every month, every six months, every 12 months, etc.), responsive to a consumer or interface call for data, response to an interface requesting data in response to detecting consumer activity, or the like. Timestamps can be associated with individual data of individual data transmissions and/or an aggregated data transmission (e.g., aggregate for scoring purposes). The telematics data-based driving assessment platform 102 can receive and/or store the vehicle behavior telematics data 106 with the associated timestamps at one or more databases 114. Values of the first acceleration data, first braking data, first location data, and/or first speed data can be extracted from the vehicle behavior telematics data 106 (e.g., with the timestamp associations) and aggregated or combined with values extracted from personal mobility telematics data 116 to create the driving behavior assessment. The vehicle behavior telematics data 106 can be associated with the vehicle 110 independently from any associations with the target vehicle operator 112, and/or the vehicle behavior telematics data 106 can be associated with both the vehicle 110 and the target vehicle operator 112 operating the vehicle 110 at the time the vehicle behavior telematics data 106 is generated (e.g., by using the personal mobility telematics data 116, a Bluetooth sync, a trip match with a previous trip start or trip end point, or the like).

For instance, the personal mobility telematics data 116 can be generated and/or sent from a mobile device 118 associated with the target vehicle operator 112 while the target vehicle operator 112 is operating the vehicle 110. A driving assessment application operating on the mobile device 118 can use the various sensor and hardware components of the mobile device 118 to generate and/or send the personal mobility telematics data 116 to the telematics data-based driving assessment platform 102. In some instances, the driving assessment application is received at the mobile device 118 from the telematics data-based driving assessment platform 102 (e.g., via an application store) in response to a request to join a driving assessment program or procedure (e.g., as part of an onboarding process). The personal mobility telematics data 116 can include data generated using a global positioning system (GPS) sensor, an accelerometer sensor, a camera, a microphone, or any other components of the mobile device 118 (e.g., which are discussed in greater detail below regarding FIG. 5). As such the personal mobility telematics data 116 can be a second type of data formatted differently than the first type of data that is the vehicle behavior telematics data 106. The personal mobility telematics data 116 can be a type of data formatted to correspond to an operating system of the mobile device 118 (e.g., iOS®, Android®, etc.) The personal mobility telematics data 116 can include values corresponding to second accelerations data, second braking data, second location data, and/or second speed data. The personal mobility telematics data 116 can be timestamped and/or associated with the target vehicle operator 112 based on the association between the target vehicle operator 112 and the mobile device 118.

The telematics data-based driving assessment platform 102 can receive the vehicle behavior telematics data 106 by way of a first connection 120 between the telematics data-based driving assessment platform 102 and the vehicle 110 formed by the OBD device 108; and a second connection 122 between the telematics data-based driving assessment platform 102 and the target vehicle operator 112 formed by the mobile device 118. The first connection 120 and the second connection 122 can be established using the respective communication ports of the vehicle behavior telematics data 106 and the mobile device 118 discussed below regarding FIG. 5. For instance, the OBD device 108 and/or the mobile device 118 can establish the first connection 120 and the second connection 122, respectively, with one or more server device(s) 124 hosting and/or executing the telematics data-based driving assessment platform 102 via one or more network(s) 126. The network(s) 126 can be any combination of one or more of a cellular network such as a 3rd Generation Partnership Project (3GPP) network, a third generation (3G) network, a fourth generation (4G) network, a fifth generation (5G) network, a Long-Term Evolution (LTE), an LTE Advanced Network, a Global System for Mobile Communications (GSM) network, a Universal Mobile Telecommunications System (UMTS) network, and the like. Moreover, the network(s) 126 can include any type of network, such as the Internet, an intranet, a Virtual Private Network (VPN), a Voice over Internet Protocol (VoIP) network, a wireless network (e.g., Bluetooth), a cellular network, a satellite network, combinations thereof, etc. The network(s) 126 can provide access to and interactions with the telematics data-based driving assessment platform 102 for the OBD device 108 and the target vehicle operator 112. The network(s) 126 can include communications network components such as, but not limited to gateways routers, servers, and registrars, which enable communication across the network(s) 126. In one implementation, the communications network components include multiple ingress/egress routers, which may have one or more ports, in communication with the network (s) 126.

Furthermore, the server device(s) 124 operating the telematics data-based driving assessment platform 102 can include at least one server device 124 hosting software, application(s), websites, and the like for receiving the vehicle behavior telematics data 106 and the personal mobility telematics data 116, storing this data at the one or more databases 114, and/or analyzing this data to generate the driving behavior assessment. The server device(s) 124 may be a single server, a plurality of servers with each such server being a physical server or a virtual machine, or a collection of both physical servers and virtual machines. In another implementation, a cloud hosts one or more components of the telematics data-based driving assessment platform 102. The server device(s) 124 may represent an instance among large instances of application servers in a cloud computing environment, a data center, or other computing environment. The server device(s) 124 can access data stored at one or more database(s) 114 (e.g., including any of the data, values, and associations discussed herein).

The telematics data-based driving assessment platform 102 executing on the server device(s) 124, and/or other resources connected to the network(s) 126, may access one or more other servers to access other websites, applications, web services interfaces, storage devices, APIs, computing devices, or the like to perform the techniques discussed herein. For instance, one server (e.g., a third-party server, a vendor server, a remote server, etc.) can receive and aggregate the vehicle behavior telematics data 106. This server can perform the analytics discussed herein on the vehicle behavior telematics data 106 to generate the policy level rating factor 104, which can then be transmitted to a second server. The second server can apply the policy level rating factor 104 (e.g., and/or other data elements) to a policy associated with the user/driver/consumer.

For instance, the telematics data-based driving assessment platform 102 executing on the server device(s) 124 can perform analytical operations to generate the driving behavior assessment for the vehicle 110 and/or the target vehicle operator 112. In some instances, the telematics data-based driving assessment platform 102 uses the vehicle behavior telematics data 106 and the personal mobility telematics data 116 to determine or generate one or more driving attributes 128 corresponding to the target vehicle operator 112, the vehicle 110, and/or one or more additional vehicle operators 130 associated with the target vehicle operator 112 and/or the vehicle 110. The driving attributes 128 can be used to determine or generate the driving behavior assessment which can be in the form of one or more driving behavior scoring factor(s) 132. The driving behavior factor(s) 132, in turn, can be used to establish the policy level rating factor 104 to be applied to one or more insurance products, such as a personalized, telematics-based insurance policy using a mix of connection types and telematics data types.

Moreover, various data types discussed herein can be presented at a user interface (UI) 134. In some instances, a user input at the UI 134 can be received by the telematics data-based driving assessment platform 102 indicating, for instance, that the target vehicle operator 112 is or would like to use the services of the telematics data-based driving assessment platform 102, or that the target vehicle operator 112 does not currently possess the OBD device 108. In response, the telematics data-based driving assessment platform 102 can send an instruction causing the OBD device 108 to be delivered to a location associated with the target vehicle operator 112 (e.g., based on the location data discussed regarding FIG. 2). Furthermore, the telematics data-based driving assessment platform 102 can receive the vehicle behavior telematics data 106 and the personal mobility telematics data 116 (e.g., from a vehicle connection and a mobile connection, respectively) and can aggregate this data up to the policy level rating factor 104. The network connecting these components, so that the data can be transmitted on the backend, can also provide a frontend user experience. For instance, the vehicle behavior telematics data 106 and the personal mobility telematics data 116 can be aggregated up into the driving attributes 128. The driving attributes 128 can be presented at the UI 134 in an easily digestible format, and on a more frequent basis (e.g., multiple times per day, per week, per month, etc.) than the frequency of generating the policy level rating factor 104 and/or applying the policy level rating factor 104 to a policy. These and various other operations are discussed in greater detail below regarding FIGS. 2-5.

Figure 2:
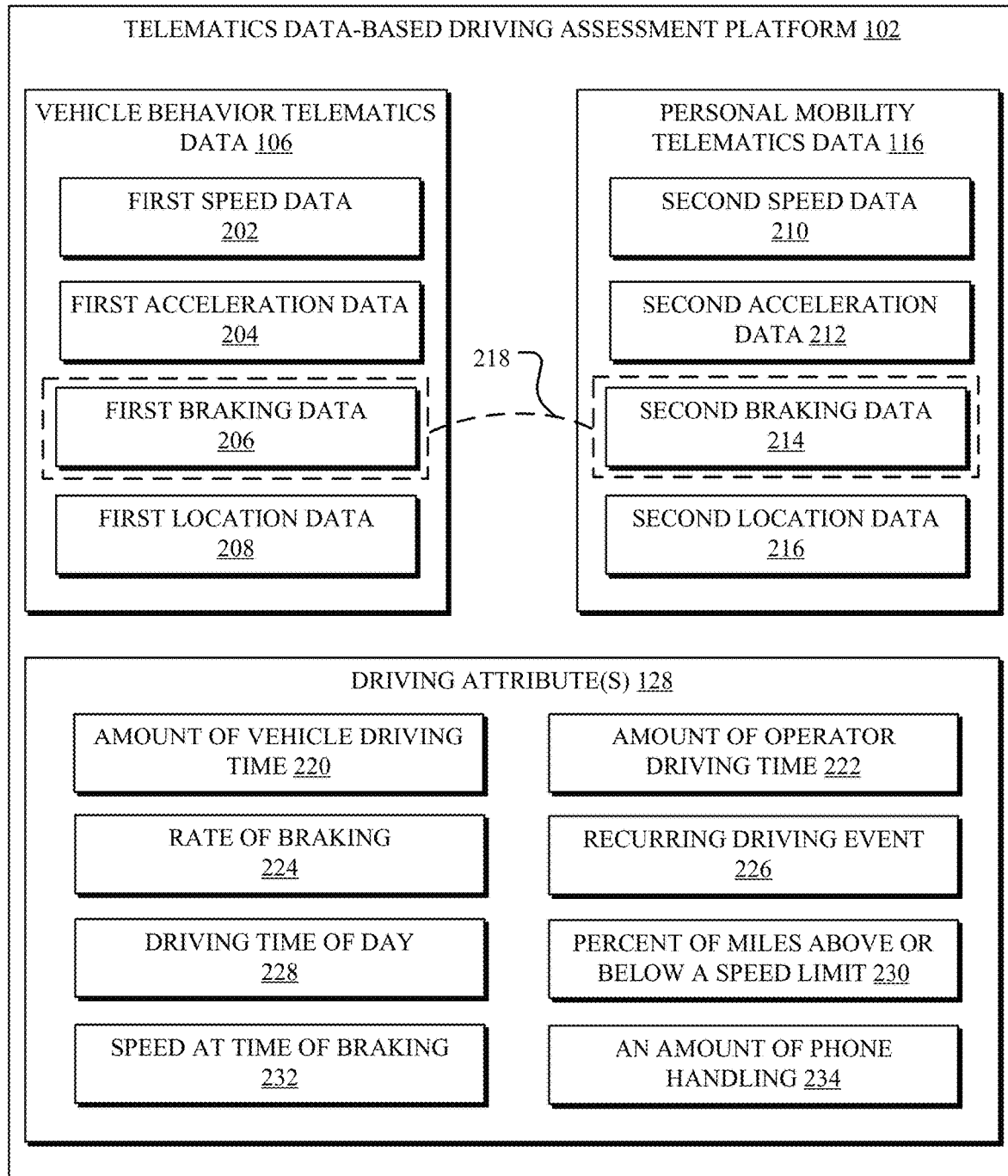
FIG. 2 illustrates an example system to generate a driving behavior assessment using different types of telematics data to determine driving attributes.

FIG. 2 illustrates an example system 200 to assess driving behavior using different types of telematics data to generate the driving attribute(s) 128. The different types of telematics data can include the vehicle behavior telematics data 106, such as first speed data 202, first acceleration data 204, first braking data 206, first location data 208, and combinations thereof. Moreover, the different types of telematics data can include the personal mobility telematics data 116, such as second speed data 210, second acceleration data 212, second braking data 214, second location data 216, and combinations thereof. Using combinations of the different types of telematics data, the telematics data-based driving assessment platform 102 can generate the driving attributes 128, which can correspond to the target vehicle operator 112, the vehicle 110, the additional plurality of vehicle operators 130, and/or combinations thereof.

In some examples, the telematics data-based driving assessment platform 102 can perform a data selection procedure 218 to select or decide which type of data to use. For instance, the telematics data-based driving assessment platform 102 can compare one of the types of vehicle behavior telematics data 106 to the corresponding type of data from the personal mobility telematics data 116 to perform an assessment of the different types of data. The telematics data-based driving assessment platform 102 can determine a first timestamp corresponding to first data form the vehicle behavior telematics data 106 (e.g., the first braking data 206) and a second timestamp corresponding to second data from the personal mobility telematics data 116 (e.g., the second braking data 214). Then the telematics data-based driving assessment platform 102 can determine which of these timestamps is a more recent timestamp, and use the data corresponding to the more recent timestamp (e.g., the first data or the second data) to generate the driving attribute(s) 128. The telematics data-based driving assessment platform 102 can determine that a particular timestamp corresponds to another timestamp of an event identified in another data type (e.g., the first acceleration data 204, the second acceleration data 212, etc.) and, accordingly, select to use the data associated with that timestamp (e.g., the first data or the second data). In some examples, the vehicle behavior telematics data 106 and/or the personal mobility telematics data 116 can be a qualified data set collected over a 12-month period of time, with one or two timestamps defining the data collection period of 12-months. As such, the driving attributes 128 determined from the vehicle behavior telematics data 106 and/or 116 can be associated with the data collection period (e.g., a same timestamp representing the data collection period).

Additionally or alternatively, the data selection procedure 218 can include detecting an omission of data (e.g., a missing data entry, a partial transmission, a corrupted filed, a noise-filled signal, and the like) in one of the first data or the second data. The omission of data can occur as a data collection error, and/or as a result of the data collection device (e.g., the OBD device 108) only being able to collect certain types of data, while omitting an ability to collect other types of data. In response to the omission of data, the telematics data-based driving assessment platform 102 can determine to use the data from the other data source. For instance, if the data omission occurs in the first data of the vehicle behavior telematics data 106, the telematics data-based driving assessment platform 102 can select the corresponding second data of the personal mobility telematics data 116. Likewise, if the data omission occurs in the second data of the personal mobility telematics data 116, the telematics data-based driving assessment platform 102 can select to use the first data of the vehicle behavior telematics data 106. In some instances, the telematics data-based driving assessment platform 102 can have a default data type (which can be either the vehicle behavior telematics data 106 or the personal mobility telematics data 116) and may use the other data type as a secondary data type when the default data type is unavailable, includes the data omission, or has a time stamp outside a predetermined time period threshold (e.g., 7 days old, 30 days old, 60 days old, etc.).

The telematics data-based driving assessment platform 102 can also use both the first data of the vehicle behavior telematics data 106 and the second data of the personal mobility telematics data 116 averaged together. In some instances, one or more weighing coefficients can be generated and applied to the vehicle behavior telematics data 106 and/or the personal mobility telematics data 116 during a data aggregation process. A first weighing coefficient can be generated for the vehicle behavior telematics data 106 and a second weighing coefficient can be generated for the personal mobility telematics data 116, with the first weighing coefficient being greater than the second weighing coefficient.

Upon performing the data selection procedure 218, the telematics data-based driving assessment platform 102 can generate the driving attributes 128 by weighing, combining, and performing other analytical techniques on the vehicle behavior telematics data 106 and/or the personal mobility telematics data 116. For instance, the telematics data-based driving assessment platform 102 can determine an amount of vehicle driving time 220 corresponding to the vehicle 110 using the vehicle behavior telematics data 106 (e.g., using timestamps for vehicle activity on which any of the aforementioned data types are based). An amount of operator driving time 222 can be determined from the personal mobility telematics data 116 corresponding to the target vehicle operator 112 and/or the one or more additional vehicle operators 130. For instance, the telematics data-based driving assessment platform 102 can aggregate the operator driving time 222 for the target vehicle operator 112 by determining times that the target vehicle operator 112 is operating the vehicle 110. This can be done by matching vehicle behavior telematics data 106 with the personal mobility telematics data 116 (e.g., detecting that the first location data 208 and the second location data 216 are within a predefined distance at a particular time, or that the other types of data are aligned or synced up at a particular time).

Furthermore, the telematics data-based driving assessment platform 102 can determine other driving attributes 128 that can correspond to the vehicle 110, the target vehicle operator 112, the one or more additional vehicle operators 130, or any combinations thereof. These driving attributes 128 can include a rate of braking 224 determined by detecting and/or averaging one or more deceleration events; a recurring driving event 226 determined by detecting a repeating driving pattern on an hourly, daily, weekly, or monthly basis; a driving time of day 228 which can include an average driving time of day over many driving events or a particular driving time of day for a particular driving event; a percent of miles above or below a speed limit 230 (e.g., determined over a predetermined amount of time); a speed at time of braking 232 (e.g., based on using first speed data 202 and/or second speed data 210); and/or an amount of phone handling 234 (e.g., based on detecting phone usage activity occurring while driving).

In some examples, various driving attributes 128 can be associated together (e.g., based on matching corresponding timestamps) and/or associated with other information accessible to the telematics data-based driving assessment platform 102 to create other, more advanced driving attributes 128. This can provide additional information on which the driving behavior scoring factor(s) 132 can be based. For instance, the telematics data-based driving assessment platform 102 can determine the rate of braking 224 associated with the speed at the time of braking 232; the driving time of day 228 associated with the recurring driving event 226; the percent of miles above or below the speed limit 230 associated with the driving time of day 228; the percent of miles above or below the speed limit 230 associated with a population density of an area being driven through; a driving speed (e.g., the speed at time of braking 232) associated with the driving time of day 228; the driving speed (e.g., the speed at time of braking 232) associated with the population density of the area being driven through; and combinations thereof. As such, the telematics data-based driving assessment platform 102 can generate a more complete, sophisticated, and personalized driving assessment for the target vehicle operator 112.

Figure 3:
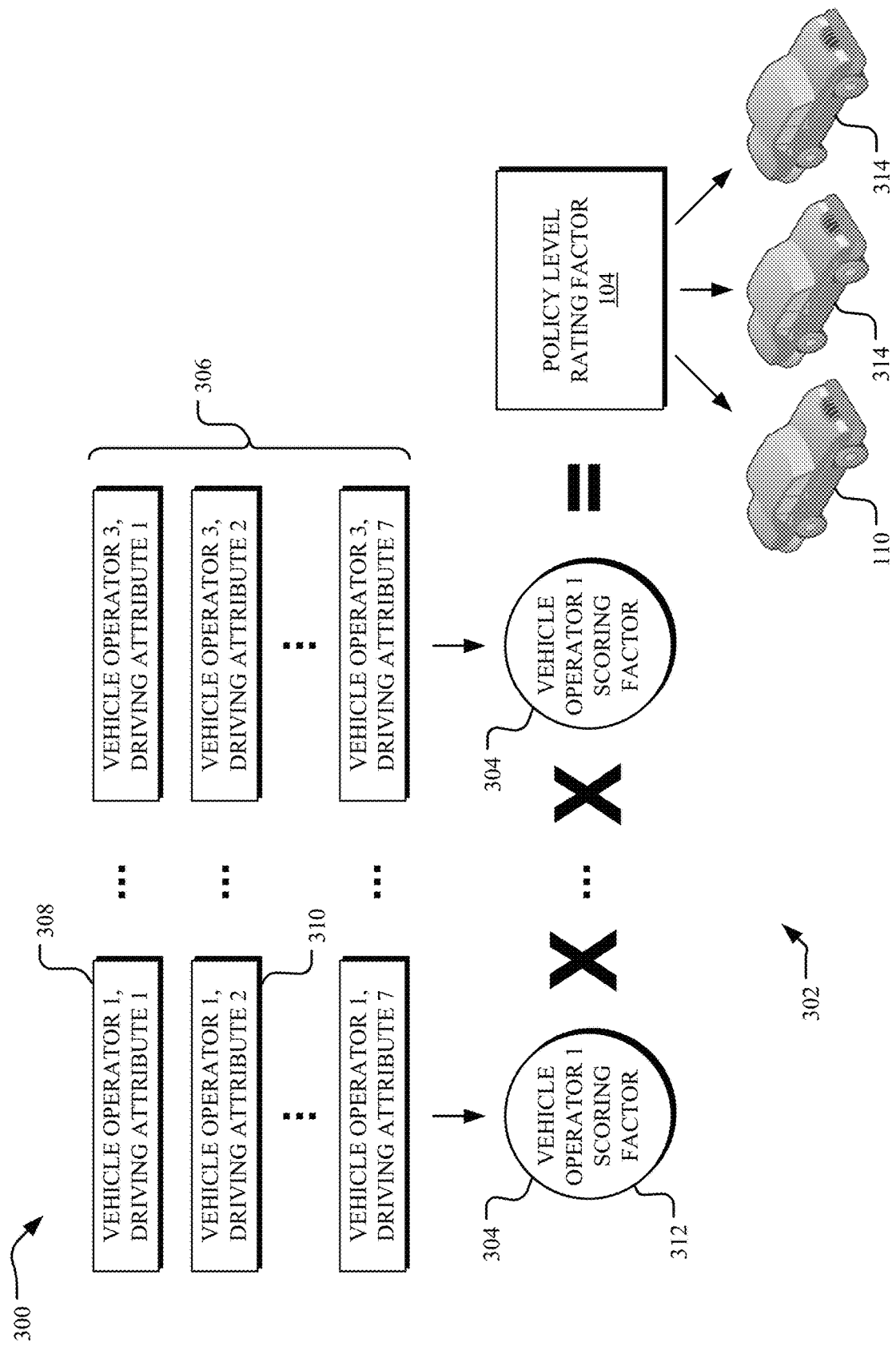
FIG. 3 illustrates an example system to generate a driving behavior assessment using different types of telematics data and a vehicle operator-based scoring procedure.

Turning to FIG. 3, an example system 300 to assess driving behavior using different types of telematics data by generating the driving behavior scoring factors 132 is depicted. The system 300 shown in FIG. 3 can perform a vehicle operator-based scoring procedure 302 to generate the driving behavior scoring factors 132, which can include one or more vehicle operator scoring factor(s) 304.

In some examples, the vehicle operator-based scoring procedure 302 can include determining a plurality of vehicle operator driving attribute ratings 306 which are aggregated to generate the vehicle operator scoring factor(s) 304. For instance, a first vehicle operator driving attribute rating 308 can correspond to a particular vehicle operator (e.g., "vehicle operator 1" which can be the target vehicle operator 112) and a particular driving attribute 128 associated with the particular vehicle operator (e.g., "driving attribute 1" which can be the rate of braking 224). The first vehicle operator driving attribute rating 308 can rate the target vehicle operator 112 based on a degree of risk associated with the particular driving attribute 128 for that particular vehicle operator (e.g., via a scaled rating between 1-5, 1-10, or 1-100, a relative rating such as "low," "medium," or "high," or the like). For instance, the first vehicle operator driving attribute rating 308 can rate, for the particular vehicle operator, a degree of risk associated with the particular driving attribute 128, which can be the amount of operator driving time 222, the rate of braking 224, the recurring driving event 226, the driving time of day 228, the percent of miles above or below the speed limit 230, the speed at the time of braking 232, the amount of phone handling 234, or combinations thereof.

The vehicle operator-based scoring procedure 302 can repeat this process for a second vehicle driving attribute rating 310, which can be associated with the first vehicle operator and a second driving attributes 128, and any number of vehicle driving attributes 128. Upon generating the factor(s) 304 associated with the first vehicle operator, a first vehicle operator scoring factor 312 of a plurality of factor(s) 304 can be generated for the first vehicle operator (e.g., the target vehicle operator 112). This process can be performed again for any number of vehicle operators (e.g., the one or more additional vehicle operators 130) to generate the plurality of vehicle operator scoring factors 304, which can correspond to the different vehicle operators. Once the plurality of vehicle operator scoring factor(s) 304 are determined, they can be combined/aggregated to create the policy level rating factor 104. The policy level rating factor 104 can be a value, metric, or formula based on the factor(s) 304 that is applied to various insurance products or policies in order to integrate the data insights generated by the telematics data-based driving assessment platform 102 into the products or policies. The policy level rating factor 104 can be specific for the vehicle 110, other vehicles 314 associated with the target vehicle operator 112, the target vehicle operator 112, and/or the one or more additional vehicle operators 130 associated with the target vehicle operator 112. In some examples, artificial intelligence such as supervised machine learning, neural networks, and other algorithms or techniques may be trained through one or more iterative and validation processes using historical telematics data, policy holder data, risk values associated with the policy holder data, outcomes associated with the policy holder data, and the like to generate the vehicle operator driving attribute ratings 306, the vehicle operator scoring factor(s) 304, and/or the policy level rating factor 104.

Figure 4:
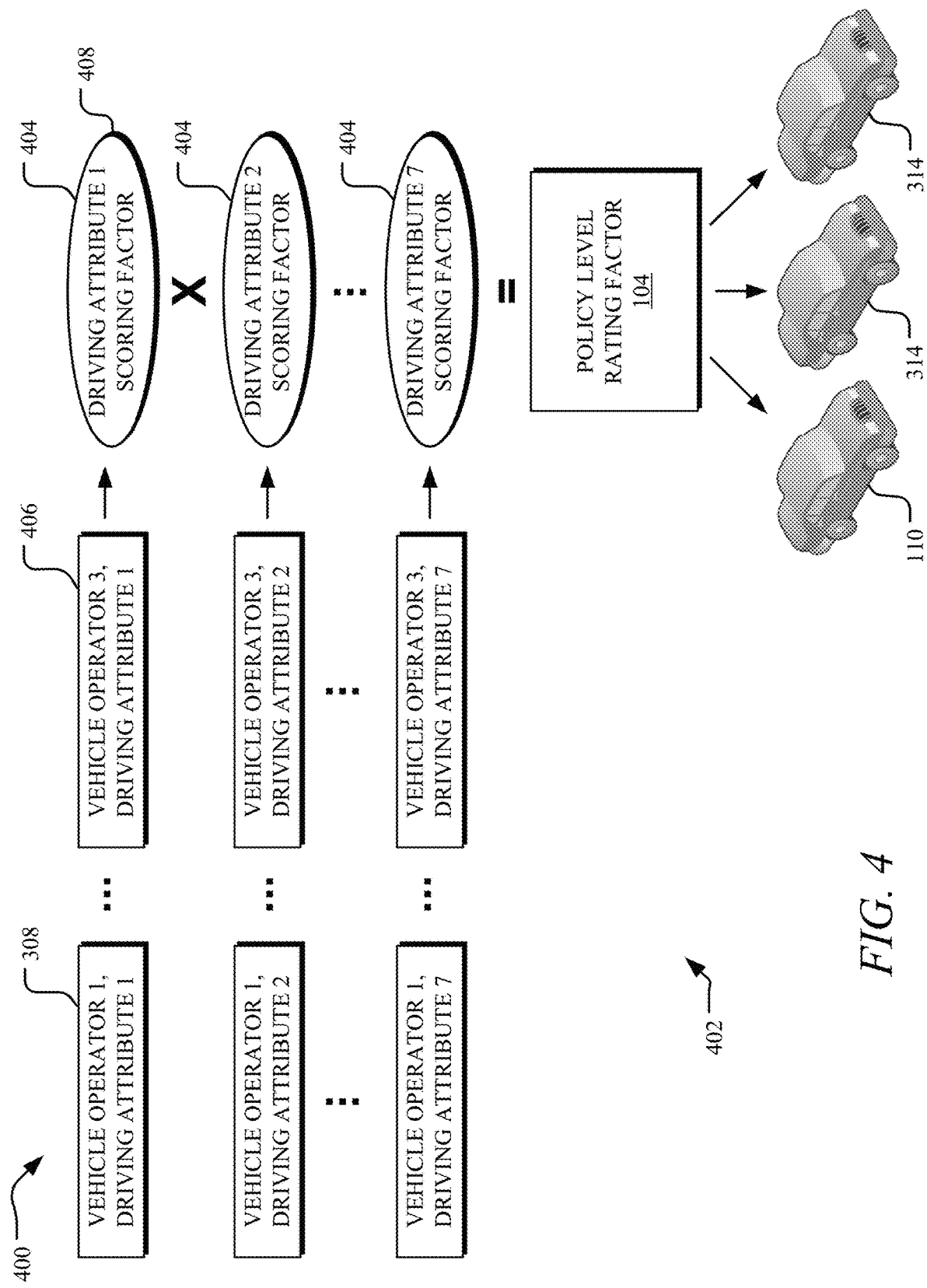
FIG. 4 illustrates an example system to generate a driving behavior assessment using different types of telematics data and a driving attribute-based scoring procedure.

FIG. 4 illustrates an example system 400 to assess driving behavior using different types of telematics data to generate the driving behavior scoring factor(s) 132. The system 400 can perform a driving attribute-based scoring procedure 402 to generate the driving behavior scoring factor(s) 132, which can include one or more driving attribute scoring factor(s) 404.

In some examples, the driving attribute-based scoring procedure 402 can include a process to determine the plurality of vehicle operator driving attribute ratings 306, similar to the vehicle operator-based scoring procedure 302 discussed above. However, upon generating the vehicle operator driving attribute ratings 306, the driving attribute-based scoring procedure 402 can aggregate the vehicle operator driving attribute ratings 306 based on the particular driving attribute 128, rather than based on the particular vehicle operator. For instance, the driving attribute-based scoring procedure 402 can aggregate the first vehicle operator driving attribute rating 308 associated with the first vehicle operator and a first driving attribute (e.g., "vehicle operator 1" and "driving attribute 1"); a second vehicle operator driving attribute rating associated with a second vehicle operator and the first driving attribute; a third vehicle operator driving attribute rating 406 associated with a third vehicle operator and the first driving attribute (e.g., "vehicle operator 3" and "driving attribute 1"); and/or any number of vehicle operator driving attribute ratings for any number of vehicle operators to generate a first driving attribute scoring factor 408. This process can be repeated for a second driving attribute, a third driving attribute, and so on for any number of driving attributes to generate a plurality of driving attribute scoring factors 404. Once the plurality of driving attribute scoring factors 404 are determined, they can be combined/aggregated to create the policy level rating factor 104. As noted above, the policy level rating factor 104 can be specific for the vehicle 110, other vehicles 314 associated with the target vehicle operator 112, the target vehicle operator 112, and/or the one or more additional vehicle operators 130 associated with the target vehicle operator 112.

In some examples, indications of the data generated by the telematics data-based driving assessment platform 102, including the driving attributes 128, the driving behavior scoring factor(s) 132 (e.g., the vehicle operator soring factor(s) 304 and/or the driving attribute scoring factors 404) can be presented on a UI of a computing device, such as the UI 134 of the mobile device 118. The presentation of these indications can be changed or toggled between those corresponding to the vehicle 110, the target vehicle operator 112, and/or the one or more additional vehicle operators 130, for instance, in response to receiving one or more inputs at the UI 134 (e.g., from the target vehicle operator 112).

Figure 5:
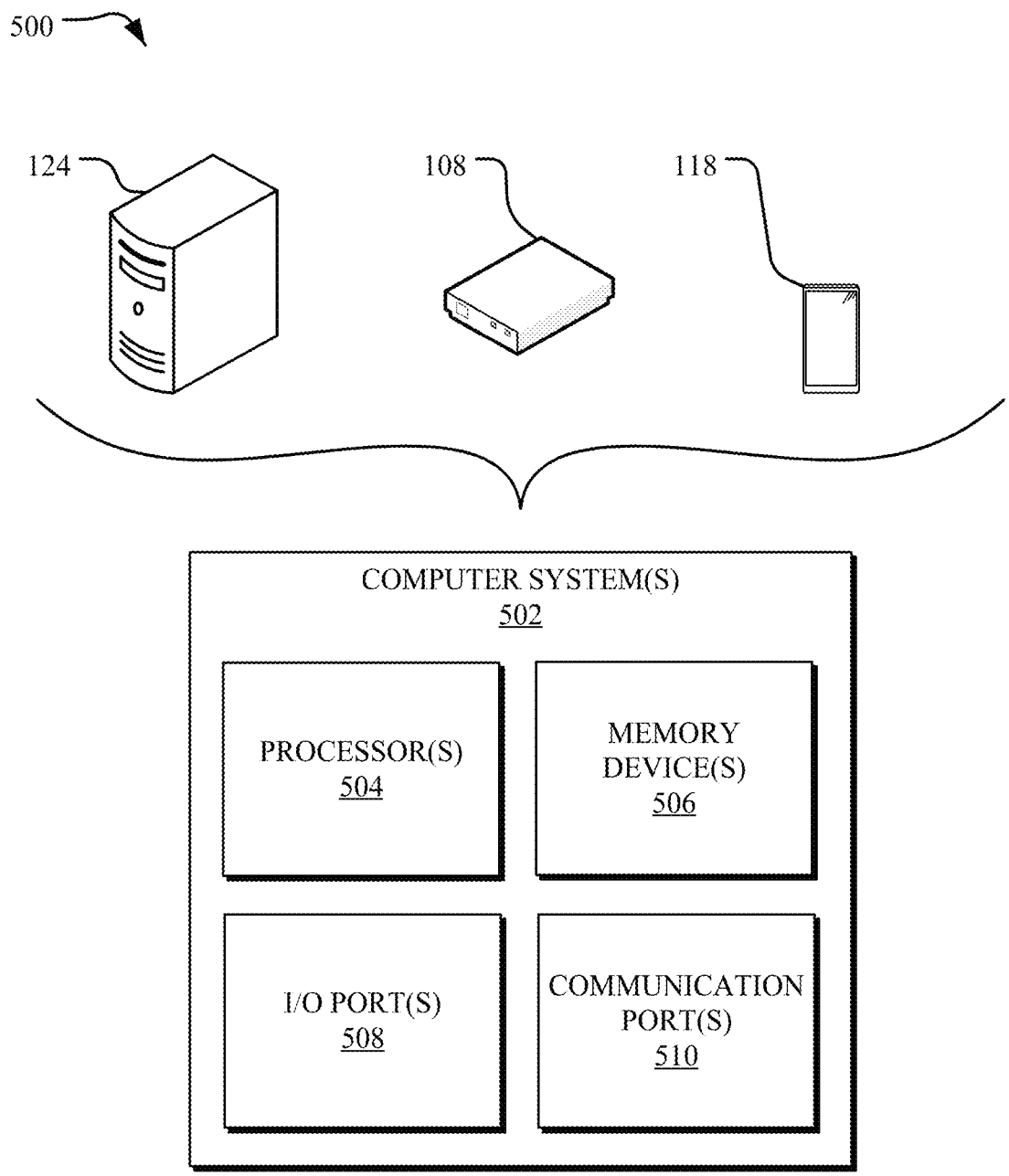
FIG. 5 illustrates an example system to generate a driving behavior assessment using different types of telematics data and one or more computing devices.

Turning to FIG. 5, a system 500 to assess driving behavior using different types of telematic data can include one or more computing device(s) 502 for performing the techniques discussed herein. In one implementation, the one or more computing device(s) 502 include the server device(s) 124 the OBD device 108, the vehicle 110, the mobile device 118 and/or other computing devices associated with the target vehicle operator 112, the additional vehicle operator(s) 130, or an insurance provider to generate and execute the telematics data-based driving assessment platform 102 as a software application and/or a module or algorithmic component of software.

In some instances, the computing device(s) 502 (e.g., the OBD device 108, the mobile device 118, the vehicle 110, etc.) can including a computer, a personal computer, a desktop computer, a laptop computer, a terminal, a workstation, a server device, a cellular or mobile phone, a mobile device, a smart mobile device a tablet, a wearable device (e.g., a smart watch, smart glasses, a smart epidermal device, etc.) a multimedia console, a television, an Internet-of-Things (IoT) device, a smart home device, a medical device, a virtual reality (VR) or augmented reality (AR) device, a vehicle (e.g., a smart bicycle, an automobile computer, etc.), and/or the like. The computing device(s) 502 may be integrated with, form a part of, or otherwise be associated with the systems 100-400. It will be appreciated that specific implementations of these devices may be of differing possible specific computing architectures not all of which are specifically discussed herein but will be understood by those of ordinary skill in the art.

The computing device 502 may be a computing system capable of executing a computer program product to execute a computer process. Data and program files may be input to the computing device 502, which reads the files and executes the programs therein. Some of the elements of the computing device 502 include one or more hardware processors 504, one or more memory devices 506, and/or one or more ports, such as input/output (10) port(s) 508 and communication port(s) 510. Additionally, other elements that will be recognized by those skilled in the art may be included in the computing device 502 but are not explicitly depicted in FIG. 5 or discussed further herein. Various elements of the computing device 502 may communicate with one another by way of the communication port(s) 510 and/or one or more communication buses, point-to-point communication paths, or other communication means.

The processor 504 may include, for example, a central processing unit (CPU), a microprocessor, a microcontroller, a digital signal processor (DSP), and/or one or more internal levels of cache. There may be one or more processors 504, such that the processor 504 comprises a single central-processing unit, or a plurality of processing units capable of executing instructions and performing operations in parallel with each other, commonly referred to as a parallel processing environment.

The computing device 502 may be a conventional computer, a distributed computer, or any other type of computer, such as one or more external computers made available via a cloud computing architecture. The presently described technology is optionally implemented in software stored on the data storage device(s) such as the memory device(s) 506, and/or communicated via one or more of the I/O port(s) 508 and the communication port(s) 510, thereby transforming the computing device 502 in FIG. 5 to a special purpose machine for implementing the operations described herein and generating the. Moreover, the computing device 502, as implemented in the systems 100-400, receives various types of input data (e.g., the vehicle behavior telematics data 106 and the personal mobility telematics data 116) and transforms the input data through various stages of the data flow into new types of data files (e.g., the driving attributes 128, and/or the driving behavior scoring factor(s) 132) Moreover, these new data files are transformed further into the policy level rating factor 104 which enables the computing device 502 to do something it could not do before—generate a policy level rating factor 104 (e.g., for an insurance product) using a mix of different types of telematics data and different types of data connections.

Additionally, the systems and operations disclosed herein represent an improvement to the technical field of vehicle telematics and sensor verification. For instance, the telematics data-based driving assessment platform 102 can provide for the usage of more granular data across different data sources, and with built in redundancies, such that more advanced driving attributes 128 can be calculated, and with improved accuracy (e.g., a reduced error range). Moreover, data can be leveraged from different data sources with varying levels of abstraction to provide a highly customized policy level rating factor 104 for individuals, while improving transparency to the end user (e.g., via presentation of the various calculations at the UI 134). These techniques are rooted in technology and could not have existed prior to the advent of vehicle telematics and/or sensor data analytics.

The one or more memory device(s) 506 may include any non-volatile data storage device capable of storing data generated or employed within the computing device 502, such as computer executable instructions for performing a computer process, which may include instructions of both application programs and an operating system (OS) that manages the various components of the computing device 502. The memory device(s) 506 may include, without limitation, magnetic disk drives, optical disk drives, solid state drives (SSDs), flash drives, and the like. The memory device(s) 506 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory device(s) 506 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the memory device(s) 506 which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computing device 502 includes one or more ports, such as the I/O port(s) 508 and the communication port(s) 510, for communicating with other computing, network, or vehicle computing devices. It will be appreciated that the I/O port 508 and the communication port 510 may be combined or separate and that more or fewer ports may be included in the computing device 502.

The I/O port 508 may be connected to an I/O device, or other device, by which information is input to or output from the computing device 502. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing device 502 via the I/O port 508. Similarly, the output devices may convert electrical signals received from the computing device 502 via the I/O port 508 into signals that may be sensed as output by a human, such as sound, light, and/or touch. The input device may be an alphanumeric input device, including alphanumeric and other keys for communicating information and/or command selections to the processor 504 via the I/O port 508. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing device 502 via the I/O port 508. For example, an electrical signal generated within the computing device 502 may be converted to another type of signal, and/or vice-versa. In one implementation, the environment transducer devices sense characteristics or aspects of an environment local to or remote from the computing device 502, such as, light, sound, temperature, pressure, magnetic field, electric field, chemical properties, physical movement, orientation, acceleration, gravity, and/or the like.

In one implementation, the communication port 510 is connected to the network 126 so the computing device 502 can receive network data useful in executing the methods and systems set out herein as well as transmitting information and network configuration changes determined thereby. Stated differently, the communication port 510 connects the computing device 502 to one or more communication interface devices configured to transmit and/or receive information between the computing device 502 and other devices by way of one or more wired or wireless communication networks or connections. Examples of such networks or connections include, without limitation, Universal Serial Bus (USB), Ethernet, Wi-Fi, Bluetooth®, Near Field Communication (NFC), and so on. One or more such communication interface devices may be utilized via the communication port 510 to communicate with one or more other machines, either directly over a point-to-point communication path, over a wide area network (WAN) (e.g., the Internet), over a local area network (LAN), over a cellular network (e.g., third generation (3G), fourth generation (4G), Long-Term Evolution (LTE), fifth generation (5G), etc.) or over another communication means. Further, the communication port 510 may communicate with an antenna or other link for electromagnetic signal transmission and/or reception.

In an example, the telematics data-based driving assessment platform 102, and/or other software, modules, services, and operations discussed herein may be embodied by instructions stored on the memory devices 506 and executed by the processor 504.

The system set forth in FIG. 5 is but one possible example of a computing device 502 or computer system that may be configured in accordance with aspects of the present disclosure. It will be appreciated that other non-transitory tangible computer-readable storage media storing computer-executable instructions for implementing the presently disclosed technology on a computing system may be utilized. In the present disclosure, the methods disclosed may be implemented as sets of instructions or software readable by the computing device 502.

Figure 6:
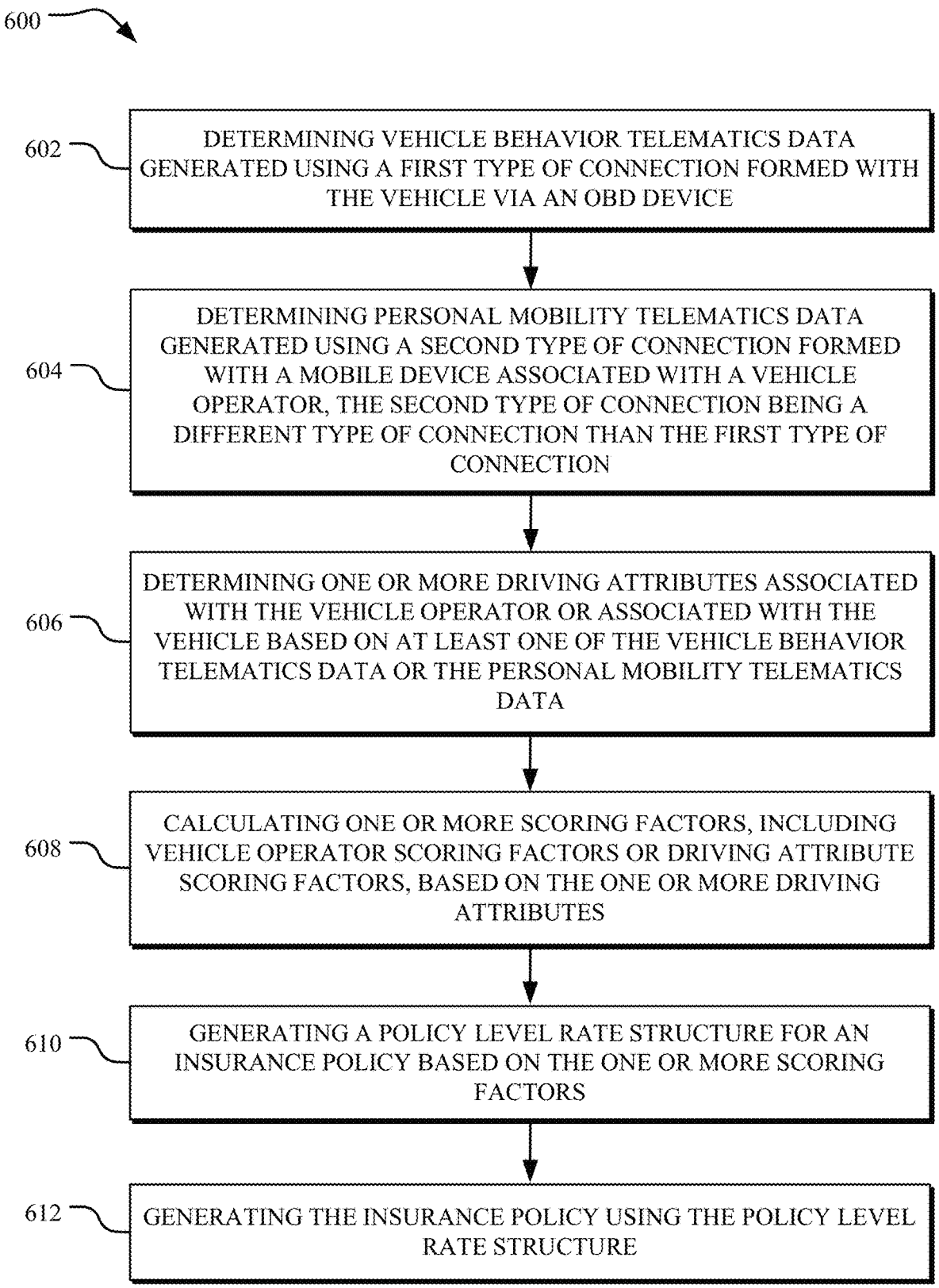
FIG. 6 illustrates an example method to generate a driving behavior assessment using different types of telematics data.

FIG. 6 depicts an example method 600 to generate a driving behavior assessment using different types of telematics data, which can be performed by any of the systems 100-500 discussed herein.

At operation 602, the method 600 can determine vehicle behavior telematics data generated using a first type of connection formed with the vehicle via an OBD device. At operation 604, the method 600 can determine personal mobility telematics data generated using a second type of connection formed with a mobile device associated with a vehicle operator, the second type of connection being a different type of connection than the first type of connection. At operation 606, the method 600 can determine one or more driving attributes associated with the vehicle operator or associated with the vehicle based on at least one of the vehicle behavior telematics data or the personal mobility telematics data. At operation 608, the method 600 can calculate one or more scoring factors, including vehicle operator scoring factors or driving attribute scoring factors, based on the one or more driving attributes. At operation 610, the method 600 can generate a policy level rate structure for an insurance policy based on the one or more scoring factors. At operation 612, the method 600 can generate the insurance policy using the policy level rate structure.

It is to be understood that the specific order or hierarchy of operations in the methods depicted in FIG. 6 and throughout this disclosure are instances of example approaches and can be rearranged while remaining within the disclosed subject matter. For instance, any of the operations depicted in FIG. 6 may be omitted, repeated, performed in parallel, performed in a different order, and/or combined with any other of the operations depicted in FIG. 6 or discussed herein.

Furthermore, any term of degree such as, but not limited to, "substantially," as used in the description and the appended claims, should be understood to include an exact, or a similar, but not exact configuration. Similarly, the terms "about" or "approximately," as used in the description and the appended claims, should be understood to include the recited values or a value that is three times greater or one third of the recited values. For example, about 3 mm includes all values from 1 mm to 9 mm, and approximately 50 degrees includes all values from 16.6 degrees to 150 degrees.

Lastly, the terms "or" and "and/or," as used herein, are to be interpreted as inclusive or meaning any one or any combination. Therefore, "A, B, or C" or "A, B, and/or C" mean any of the following: "A," "B," or "C"; "A and B"; "A and C"; "B and C"; "A, B and C." An exception to this definition will occur only when a combination of elements, functions, steps or acts are in some way inherently mutually exclusive.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined differently in various implementations of the disclosure or described with different terminology. These and other variations, modifications, additions, and improvements may fall within the scope of the disclosure as defined in the claims that follow.

What is claimed is:

1. A method of driving behavior assessment using telematics data, the method comprising:
    determining vehicle behavior telematics data generated using a first type of connection with a vehicle;
    identifying a first timestamp corresponding to the vehicle behavior telematics data;
    determining personal mobility telematics data generated using a second type of connection with a mobile device associated with a vehicle operator;
    identifying a second timestamp corresponding to the personal mobility telematics data;
    determining one or more driving attributes associated with the vehicle operator based on at least one of the vehicle behavior telematics data or the personal mobility telematics data, wherein the at least one of the vehicle behavior telematics data or the personal mobility telematics data is selected by a comparison of the first timestamp and the second timestamp;
    calculating one or more scoring factors based on the one or more driving attributes;
    generating a policy level rate structure for an insurance policy based on the one or more scoring factors; and
    generating the insurance policy using the policy level rate structure.

2. The method of claim 1, wherein the one or more scoring factors includes a plurality of vehicle operator scoring factors that are used to calculate the policy level rate structure, one of the plurality of vehicle operator scoring factors corresponds to an individual vehicle operator.

3. The method of claim 1, wherein the one or more scoring factors includes a plurality of behavioral component scoring factors that are used to calculate the policy level rate structure, one of the plurality of behavioral component scoring factors corresponds to a plurality of vehicle operators.

4. The method of claim 1, the insurance policy applies the policy level rate structure to a plurality of vehicles associated with the vehicle operator.

5. The method of claim 1, wherein the second type of connection is an on-board diagnostics (OBD)-II device installed at the vehicle.

6. The method of claim 5, further comprising sending, in response to receiving an input at a computing device associated with the vehicle operator, the OBD-II device to a location associated with the vehicle operator.

7. The method of claim 1, wherein:
the vehicle behavior telematics data generated using the first type of connection with the vehicle includes:
first acceleration data;
first braking data; and
first location data; and
the personal mobility telematics data generated using the second type of connection with mobile device includes:
second acceleration data;
second braking data; and
second location data.

8. The method of claim 1, further comprising generating a first weighing coefficient for the vehicle behavior telematics data and a second weighing coefficient for the personal mobility telematics data, the first weighing coefficient being greater than the second weighing coefficient.

9. The method of claim 1, further comprising:
detecting a telematics data omission in the vehicle behavior telematics data; and
in response to detecting the telematics data omission, determining the one or more driving attributes based on the personal mobility telematics data instead of the vehicle behavior telematics data.

10. The method of claim 1, further comprising:
determining which of the vehicle behavior telematics data and the personal mobility telematics data is more recent telematics data and less recent telematics data by comparing the first timestamp and the second timestamp; and
determining the one or more driving attributes based on the more recent telematics data instead of the less recent telematics data.

11. The method of claim 1, further comprising:
causing, at the mobile device, a user interface (UI) to be generated presenting one or more indications of the one or more driving attributes.

12. The method of claim 11, wherein the one or more driving attributes include two or more of:
a rate of braking;
a driving speed at a time of braking;
a driving time of day;
a recurring driving event;
a percent of miles above or below a speed limit; and
an amount of phone handling.

13. The method of claim 12, wherein:
the vehicle operator is a first vehicle operator; and
the one or more indications are changeable, based on a vehicle operator input received at the UI, between corresponding to the vehicle, the first vehicle operator, or a second vehicle operator associated with the first vehicle operator.

14. A system of driving behavior assessment using telematics data, the system comprising:
at least one processor configured to:
determine vehicle behavior telematics data generated using a first type of connection with a vehicle;
identify a first timestamp corresponding to the vehicle behavior telematics data;
determine personal mobility telematics data generated using a second type of connection with a mobile device associated with a vehicle operator;
identify a second timestamp corresponding to the personal mobility telematics data;
determine one or more driving attributes associated with the vehicle operator based on at least one of the vehicle behavior telematics data or the personal mobility telematics data, wherein the at least one of the vehicle behavior telematics data or the personal mobility telematics data is selected by a comparison of the first timestamp and the second timestamp;
calculate a plurality of vehicle operator scoring factors or a plurality of driving attribute scoring factors based on the one or more driving attributes, one of the plurality of vehicle operator scoring factors corresponds to an individual vehicle operator, and one of the plurality of driving attribute scoring factors corresponds to a plurality of vehicle operators;
generate a policy level rate structure for an insurance policy based on the plurality of vehicle operator scoring factors or the plurality of driving attribute scoring factors; and
generate the insurance policy using the policy level rate structure.

15. The system of claim 14, wherein the one or more driving attributes include a rate of braking associated with a driving speed at a time of the braking.

16. The system of claim 14, wherein the one or more driving attributes include a driving time of day associated with a recurring driving event.

17. The system of claim 14, wherein the one or more driving attributes include a driving speed associated with a population density or associated with a time of day.

18. The system of claim 14, wherein the one or more driving attributes include a percent of miles over a speed limit associated with a population density or associated with a time of day.

19. One or more tangible non-transitory computer-readable storage media storing computer-executable instructions for performing a computer process on a computing system, the computer process comprising:
determining vehicle behavior telematics data generated using a first type of connection via an onboard diagnostics (OBD) installed in a vehicle;
identifying a first timestamp corresponding to the vehicle behavior telematics data;
determining personal mobility telematics data generated using a second type of connection with a mobile device associated with a vehicle operator;
identifying a second timestamp corresponding to the personal mobility telematics data;
determining one or more driving attributes associated with the vehicle operator based on the vehicle behavior telematics data and the personal mobility telematics data, wherein a comparison of the vehicle behavior telematics data and the personal mobility telematics data is performed to determine the one or more driving attributes;
calculating one or more scoring factors based on the one or more driving attributes;
generating a policy level rate structure for an insurance policy based on the one or more scoring factors; and generating the insurance policy using the policy level rate structure.

20. The one or more tangible non-transitory computer-readable storage media storing computer-executable instructions for performing the computer process on the computing system of claim 19, wherein the one or more driving attributes associated with the vehicle operator include:
   an amount of driven miles associated with the vehicle based on the vehicle behavior telematics data; and
   a driving speed associated with the vehicle operator based on the personal mobility telematics data.

\* \* \* \* \*